(12) United States Patent
Jin

(10) Patent No.: US 7,242,674 B2
(45) Date of Patent: Jul. 10, 2007

(54) SYSTEM AND METHOD OF CONTROLLING MULTIMEDIA CALL IN MOBILE COMMUNICATION SYSTEM

(75) Inventor: Jong Hyun Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 898 days.

(21) Appl. No.: 10/022,209

(22) Filed: Dec. 20, 2001

(65) Prior Publication Data
US 2002/0077096 A1    Jun. 20, 2002

(30) Foreign Application Priority Data
Dec. 20, 2000   (KR) ............................... 2000-78890
Apr. 6, 2001    (KR) ............................... 2001-18193

(51) Int. Cl.
H04Q 7/00    (2006.01)
H04Q 7/20    (2006.01)
H04L 12/66   (2006.01)

(52) U.S. Cl. ................ 370/329; 370/337; 370/352; 455/450

(58) Field of Classification Search ............... 370/350, 370/329; 379/88.13; 455/67.7, 509
See application file for complete search history.

(56) References Cited

U.S. PATENT DOCUMENTS

| | | | |
|---|---|---|---|
| 5,627,978 A | * | 5/1997 | Altom et al. ............... 715/758 |
| 6,111,866 A | * | 8/2000 | Kweon et al. .............. 370/335 |
| 6,594,276 B1 | * | 7/2003 | Le .............................. 370/465 |
| 6,678,527 B1 | * | 1/2004 | Rasanen ..................... 455/450 |
| 6,810,035 B1 | * | 10/2004 | Knuutila et al. ............ 370/354 |

FOREIGN PATENT DOCUMENTS

WO    0067501    * 11/2000

* cited by examiner

Primary Examiner—Steven Nguyen
(74) Attorney, Agent, or Firm—Ked & Associates, LLP

(57) ABSTRACT

Systems and methods control a multimedia call/service in a communication system between mobile stations that exist in the same network. A method of controlling the multimedia call can initiate a radio call in a mobile station, recognize a multimedia call service option transmitted from the mobile station, set up the radio call via a base station where the receiving mobile station is located by using the multimedia call service option and the receiving telephone number, confirm in the receiving mobile station and notify a receiving user. The multimedia call between the originating/receiving stations is set up after the radio call. Therefore, the systems and method according to the invention can process the multimedia call only through a base station and a mobile switching center without passing through an inter-working module or a packet data serving node in the mobile communication system.

26 Claims, 6 Drawing Sheets

SYSTEM AND METHOD OF CONTROLLING MULTIMEDIA CALL IN MOBILE COMMUNICATION SYSTEM

BACKGROUND OF THE INVENTION

1. Field of the Invention

The present invention relates to a mobile terminal in a mobile communication system, and more particularly, to a system and method of controlling a multimedia call in a mobile communication system.

2. Background of the Related Art

Mobile terminals for providing a voice service are common. Use of Portable Computers (PCs) is rapidly spreading because of the cost decline of information and communication instruments. Thus, a mobile communication system currently receives requests of a radio data service in which a mobile telephone network is accessed using the mobile terminals and the portable PCs, and then a communication function is performed therebetween.

Such a mobile communication system sets up a data call between visual terminals via an Inter-Working Function (IWF) or a Public Data Serving Node (PDSN) for modem emulation or packet network access. In other words, the visual terminal in the mobile communication system is call-processed based upon a data service.

A system and method for controlling a data call in a mobile communication system of a related art communication terminal will now be described. FIG. 1 is a diagram that shows a method for connecting the data call in the related art mobile communication system. FIG. 2 shows a protocol for connecting the data call in the related art mobile communication system.

As shown in FIG. 1, a system for connecting the data call has a Mobile Station (MS) 101 for originating/receiving a radio data and a Base Station/Base Station Controller (BS/BSC) 102 for relaying the radio data of the MS 101 in local units. A Mobile Switching Center (MSC) 103 is for setting up a communication path according to a communication service requested from the MS 101. An Inter-Working Function (IWF) or a Packet Data Serving Node (PDSN) 104 is connected to the MSC 103 for performing a modem pool function for data service calling and internet access. A Public Switched Telephone Network (PSTN) 105 is for data communication and is connected to a data Mobile Terminal (MT) 106.

The MSC 103 processes a mobile call, inter-works to a subscriber information-processing unit, manages a visiting subscriber, processes a data call with the IWF and inter-works to other networks such as the PSTN/PCS. The IWF matches the transmission speed between the mobile telephone network and the PSTN and performs a modem pool function, and the PDSN allows the MS 101 to use a mobile Internet Protocol (IP) service after Point-to-Point Protocol (PPP) connection.

As shown in FIG. 2, the MS 101 and the BS 102 use the Radio Link Protocol (RLP) for originating/receiving a reliable data in a radio section, and an interval between the MS 101 and the IWF or PDSN 104 is connected by a PPP frame.

As shown in FIGS. 1 and 2, the MS 101 sets up the RLP with the BS/BSC 102 during conversation. When the RLP is set up, the PPP is set up with the IWF or PDSN 104 through the MSC 103.

The RLP is an NAK (Negative Acknowledge)-based protocol that is devised according to a scheme for reducing an error rate occurring in data transmission considering the features of the radio section. Examples of NAK-based protocol include the RLP1 for the IS-95A, the RLP2 for the IS-95B and the RLP3 for the IS-2000.

Further, as shown in FIG. 2, a relay layer is set up between the BS/BSC 102 and the MSC 103 and between the MSC 103 and the IWF or PDSN 104 in order to set up a PPP call. In other words, the relay layer is an IS-95 series layer for an air interface, which is described in standards such as IS-707, sets up the PPP call in a counterpart data MT 106 connected to the MS 101 and produces the data call via a specific number.

As a procedure for setting up a service call from the MS 101, upon data transmission from the MS 101 to the RLP, the BS/BSC 102 converts a received data into a type of internal message, and then the BS/BSC 102 transmits the converted data to the IWF 104 via the MSC 103. In sequence, the IWF 104 extracts a pure data from the received message and transmits the pure data to the data MT 106 via the PSTN 105. Data generated from the data MT 106 is transmitted in the same manner but in an inverse sequence from the PSTN 105 via the IWF 104.

The IWF 104 also performs a function of connecting to the PSTN 105 for a packet service. Thus, the IWF L04 uses the PPP in the link layer for connection with the internet network in the MS 101.

As described above, the related art mobile communication system has various disadvantages. In such a related art mobile communication system, a service should be used with one of a call service for data or the packet service for mutually connecting the visual display terminals.

Further, according to a line switching scheme in the related art mobile stations, one station should be set up in a modem-responding state and then another station modem-accesses to the counterpart. This line switching scheme can be currently performed up to 14.4 Kbps, but is required to use the IWF or the PDSN for a packet mode data service, which incurs problems of system load and delay.

In other words, since the IP of the mobile station is dynamically allocated and the IP can be allocated differently in every access when the mobile station uses the packet service option, it is difficult to set up a bidirectional call via IP in the related art mobile communication system. Also, since the related art mobile communication system necessarily passes through the IWF or PDSN for processing the multimedia call, there are problems of system load and delay.

Further, since the IWF or PDSN passes through a PPP/TCP stack when setting up the call between the visual terminals in the related art mobile communication system, there is a problem of a transmission delay because of the delay in a call processing or transmission of data during a call connection. Such transmission delay is fatal to the visual terminal that takes a real-time processing. Also, when the visual terminal is generalized, the visual terminal in the same network may unnecessarily pass through the IWF or the PDSN for connection, which creates overload.

In addition, when initiating the data call between the each mobile station and the base station, the service time point can be mismatched in the view of a higher application protocol because of a difference in time points of call establishment at both terminals, and thus unnecessary data can be transmitted. In other words, the receiving station responds when a certain time period elapses after the traffic channel is established between the originating station and the base station, so that the inconsistency takes place in the data exchanging time points between the both terminals after the traffic channel is opened between the base station and the receiving terminal. Accordingly, there is a problem that the receiving station may unnecessarily transmit the multimedia data of the originating station to the base station before call setup so that the multimedia protocol in the station can malfunction.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a system and method of controlling a multimedia call in a mobile communication system for preventing a time delay in the multimedia call processing that occurs from the same network of the mobile communication system.

Another object of the present invention is to provide a system and method of controlling a multimedia call in a mobile communication system for setting up the multimedia call without passing through the IWF or the PDSN in the mobile communication system.

Another object of the present invention is to provide a system and method of controlling a multimedia call in a mobile communication system for enabling packet data synchronization between terminals after initiating the multimedia call.

Another object of the present invention is to provide a system and method of controlling a multimedia call in a mobile communication system that is capable of setting up a multimedia call controlling process between mobile terminals similar to a line switching system to simplify a call setting process between the terminals.

Another object of the present invention is to provide a system and method of controlling a multimedia call in a mobile communication system that reduces system load and transmission delay.

Another object of the present invention is to provide a system and method of controlling a multimedia call in a mobile communication system by which both visual display terminals are synchronized before transmitting a multimedia data such as when the call is established between the terminals, so as to match service time points thereof.

In order to achieve the above objects in whole or in part, a system of controlling a multimedia call in a mobile communication system is provided that includes originating and receiving mobile stations that respectively initiate and respond to the multimedia call and process a visual communication by using a multimedia call service option, a base station that sets up the multimedia call using a multimedia bypass service option after recognizing the multimedia call service option of the mobile stations, a mobile switching center that sets up the multimedia call via the base station, wherein the mobile switching center controls the receiving mobile station according to the multimedia call service option from the base station/base station controller, radio link connecting circuit for directly connecting between the mobile stations through bypassing a radio link protocol after the mobile stations establish a traffic channel with the base station according to the multimedia call service option, and multimedia connecting circuit for transmitting and receiving multimedia data using a higher application protocol of the radio link protocol to maintain a visual conversation in the originating and receiving mobile stations connected by the radio link connecting circuit.

In order to achieve the above objects in whole or in part, a system of controlling a multimedia call in a mobile communication system is provided in which a data between the stations according to the multimedia call service option is transmitted via direct connection between the base station/base station controller and the mobile switching center without passing through an IWF or a PDSN.

In order to achieve the above objects in whole or in part, a method of controlling a multimedia call in a mobile communication system is provided that includes initiating a radio call by using a receiving telephone number via a user interface of an originating mobile station, recognizing in a base station/base station controller a multimedia call service option transmitted from the originating mobile station, setting up the radio call via a base station where a receiving mobile station is located by using the multimedia call service option and the receiving telephone number, confirming the radio call via the service option from the base station, and setting up the radio call by admission of a receiving user after notifying the receiving user of the receiving mobile station that the radio call using the multimedia call service option is received, and setting up the multimedia call between the originating and receiving mobile stations after the step of setting up the radio call.

In order to achieve the above objects in whole or in part, a system and method of controlling a multimedia call in a mobile communication system is provided in which both visual display stations are synchronized before multimedia data transmission when the call is established between the stations so as to match the time point of the image service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
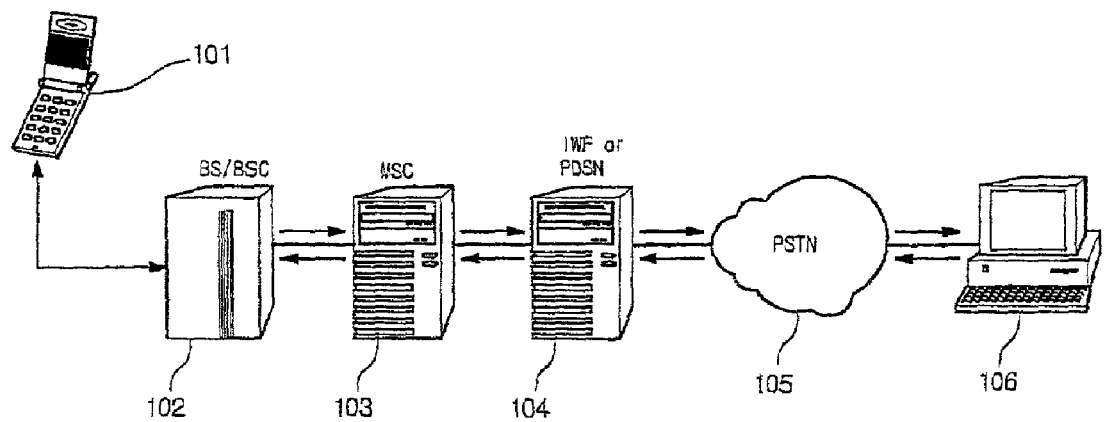
FIG. 1 is a diagram that shows a system of connecting a data call in a related art mobile communication system.
Figure 2:
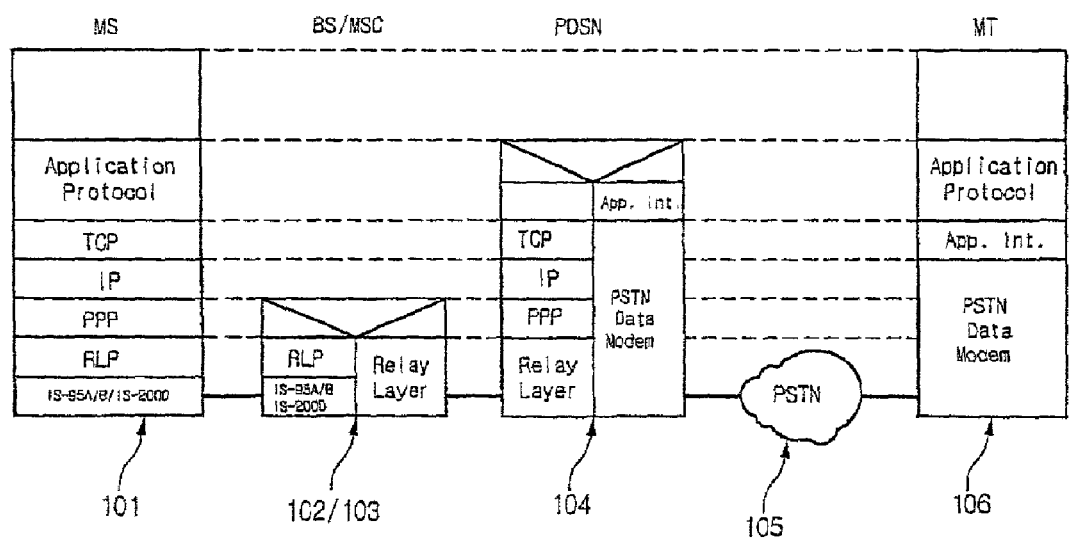
FIG. 2 is a diagram that shows a protocol for connecting a data call in a related art mobile communication system.
Figure 3:
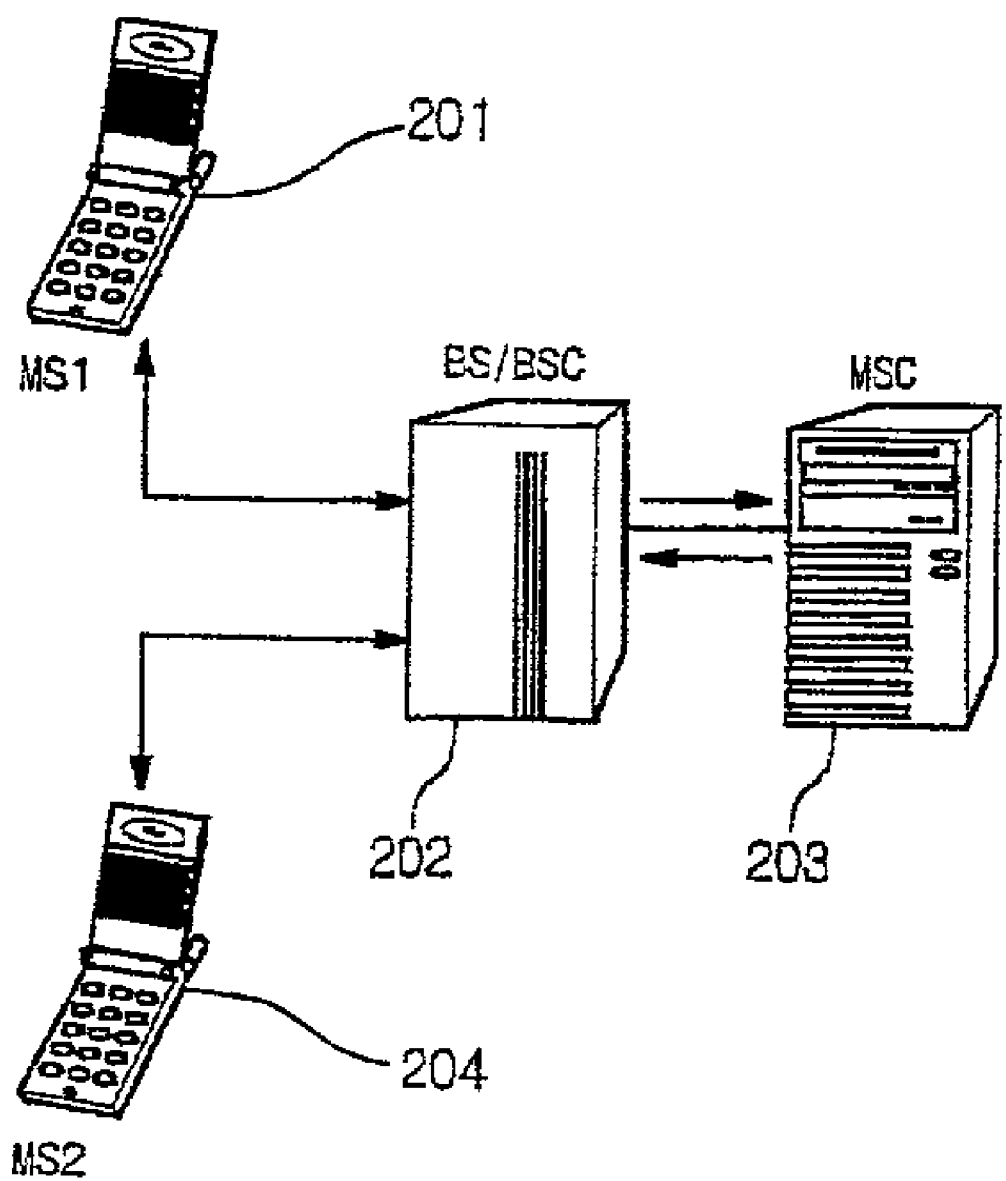
FIG. 3 is a diagram that shows a preferred embodiment of a system of controlling a multimedia call in a mobile communication system according the present invention.
Figure 4:
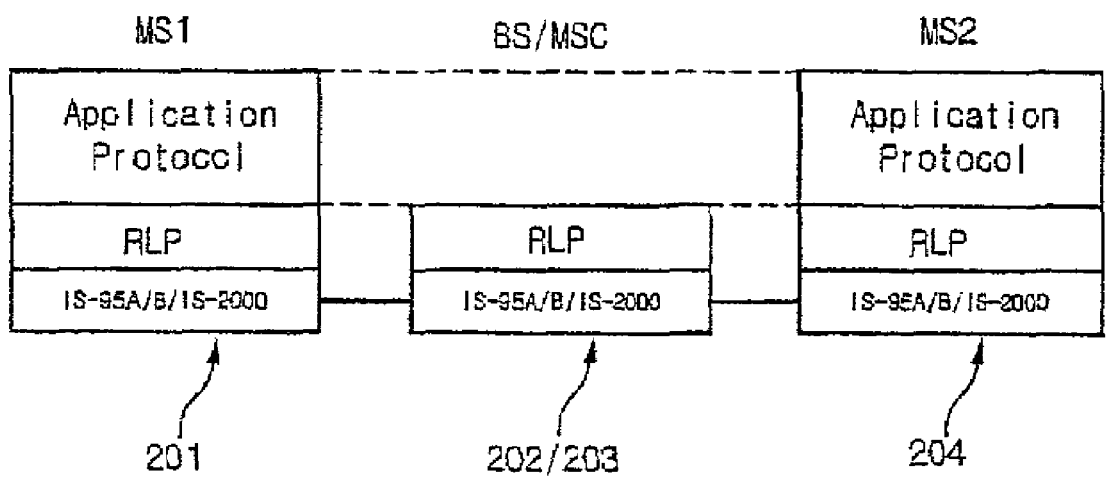
FIG. 4 is a diagram that shows a protocol for connecting a multimedia call in a mobile communication system according to the system of FIG. 3.

FIG. 3 is a diagram that shows a configuration of a first preferred embodiment of a system for controlling a multimedia call in a mobile communication system according to the present invention. FIG. 4 is a diagram that shows a protocol for connecting a multimedia call in the mobile communication system according to the first preferred embodiment of a system for controlling a multimedia call.

As shown in FIGS. 3 and 4, the system for controlling a multimedia call includes a mobile station (e.g., originating) MS1 201 for initiating the multimedia call using a multimedia call service option and for executing a visual communication in response to the initiated multimedia call, a BS/BSC 202 for recognizing the multimedia call service option of the MS 201 as a multimedia call bypass option, an MSC 203 and a (e.g., receiving) mobile station MS2 204. The MSC 203 is preferably for setting up the call via an MSC located to the receiving mobile station such as the mobile station MS2 204 using the multimedia call service option and the telephone number of a counterpart via the BS/BSC.

The MS2 204 operating as a visual display terminal confirms the multimedia call via a service option downloaded from an authorized BS/BSC 202 and notifies a user that the multimedia call is received so that the user can determine whether to receive the same. The MS2 204 drives the RLP in cooperation with the BS/BSC 202 after establishing a traffic channel, and transmits/receives a multimedia data including images and sound via a higher application protocol when the BS/BSC 202 and MSC 203 establishes a connection between the MS1 201 and the MS2 204.

The system (and preferred embodiments of methods) for controlling a multimedia call in the mobile communication system according to the first preferred embodiment will now be described using exemplary originating and receiving mobile stations in the range of the same base station for ease of description. However, the present invention is not intended to be so limited.

As shown in FIGS. 3 and 4, the MS1 201 initiates the multimedia call via the multimedia call service option. In this case, the multimedia call service option preferably directly initiates the call using a User Interface (UI) within the mobile station using the telephone number of the counter part (e.g., MS2 204). In this case, the MS1 201 can initiate the multimedia call in a mode similar to a conventional data service relay mode.

The BS/BSC 202 recognizes the image service option to transmit a multimedia call signal to the MSC 203, which sets up the call via the BS/BSC 202 for controlling the counterpart station (e.g., MS2 204) by using the multimedia call service option and the telephone number of the counterpart station.

The MS2 204 confirms the multimedia call via the service option transmitted from the controlling BS and notifies the user of the multimedia call. The user determines whether to receive the multimedia call. When received, the traffic channel is established between the MS2 204 and the BS 202 as a response from the MS2 204 when receiving the multimedia call.

The MS1 201 and the MS2 204 preferably drive the RLP with the BS/BSC 202 after such a traffic channel is established and then both the RLP of the MS1 and MS2 are connected through the BSC 202 and the MSC 203. The MS1 201 and MS2 202 each respectively transmits/receives the multimedia data and maintains the visual communication via the higher application protocol.

Such originating and receiving mobile stations preferably support the visual display terminal standards including the RLP, the H.223 as a higher application protocol and the G.723, H.263, H.245, H.324 or 3G324M as a higher application protocol of the H.223. Also, the originating and receiving mobile stations support the H.324 visual display terminal standard of fixed bit rate via the higher application protocols. However, the present invention is not intended to be limited to the above-disclosed protocols.

Meanwhile, the BS/BSC 202 uses the multimedia call bypass service option, which can internally process in a substantially similar fashion to a data service option when the multimedia call is set up in view of the multimedia call service option, but preferably directly passes the data packet to the receiving mobile station without transferring the data packet to the IWF or the PDSN. The IWF or the PDSN performs an operation for inter-working to an outer packet network, whereas it is required to simply transmit the transmission packet from the radio network to the receiving mobile station without necessarily passing through the IWF when the mobile stations 201 and 204 are mutually coupled according to the first preferred embodiment.

Further, in the multimedia call service option of each of the components, a separate service option for the multimedia call is added in a fashion so that specifics are determined about certain services through negotiation in call setup between the mobile station and the base station, which preferably allow the station or the system to recognize the multimedia call in call setup.

As described above, in contrast to the related art for connection of the multimedia call, the first preferred embodiment of a system for controlling a multimedia call in a mobile communication system sets up the multimedia call through the MSC 203 without passing through the IWF or PDSN. The BS/BSC 202 can set up the RLP (for which exemplary descriptions are in specifications such as the IS-707, a visual data bypass service option). In particular, since the bypass service option in the mobile communication system does not have a relay layer for setting up a link with a specific switching center, the IWF or the PDSN, a packet transmitted by a terminal in the switching center is immediately transmitted to the BS/BSC 202 where the MS2 204 is located.

Further, in the multimedia call communication, a packet service can be performed with a fixed or variable rate. For example, the packet service can be executed with the fixed bit rate in the IS-95A, or the packet transmission rate can be variably adjusted in the IS-95B or the IS-2000, in which the service option can be defined at the fixed bit rate in the initial setup to satisfy the visual display terminal standard of fixed bit rate such as the H.324.

Figure 6:
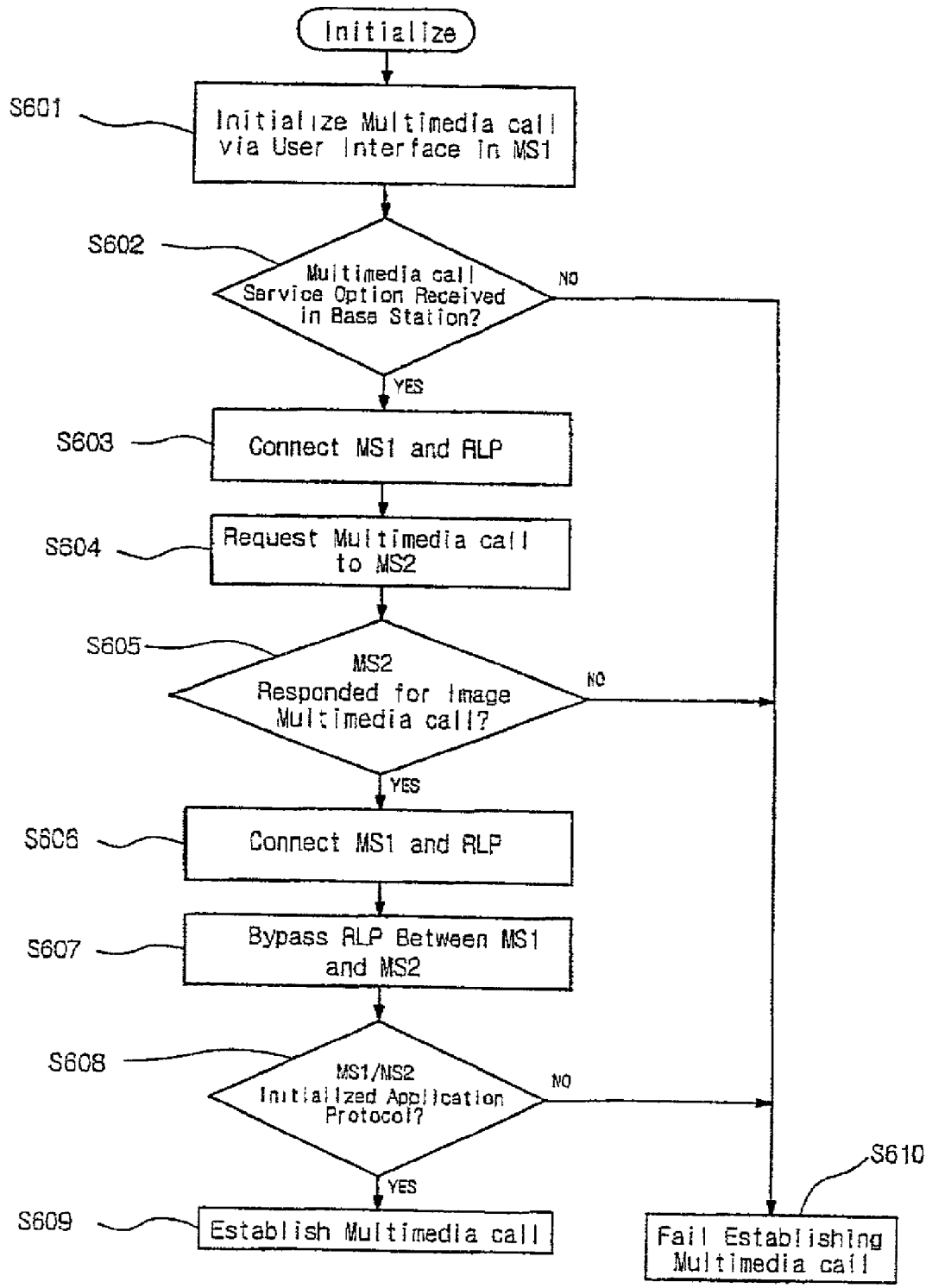
FIG. 6 is a flow chart that shows a preferred embodiment of a method of controlling a multimedia call in a mobile communication system according to the present invention.

FIG. 6 is a flow chart showing a first preferred embodiment of a method of controlling a multimedia call in a mobile communication system according to the present invention. As shown in FIG. 6, after a process starts or initialization, orientation, control continues to step S601 where the mobile station receives an intended receiving telephone number via a user interface from the user to initiate the multimedia call. In other words, the originating mobile station preferably directly initiates the call via the user interface in setting up the multimedia call, and uses the telephone number of the receiving station in setting up the call.

From step S601, control continues to step S602 where the BS recognizes the multimedia call service option of the originating mobile station and judges whether to accept the same. If the determination in step S602 is affirmative, the BS preferably connects the RLP with the originating mobile station in step S603 and then requests the multimedia call from the receiving mobile station in step S604. In this case, the base station preferably recognizes the multimedia call service option of the originating mobile station, and then notifies the mobile switching center about the call service option. Then, the mobile switching center preferably sets up the multimedia call via the base station where the mobile station is located by using the service option and the counterpart telephone number. In sequence, the receiving mobile station confirms the multimedia call via the service option transmitted from the base station, and notifies the user of the multimedia call. In this case, the user of the receiving mobile station confirms whether to receive the multimedia call, and then responds.

In step S605, the base station judges if the receiving mobile station responds to the multimedia call. If the determination in step S605 is affirmative, control continues to step S606 where the RLP is connected with the receiving mobile station.

From step S606, control continues to step S607 where each of the stations establishes the traffic channel due to the multimedia call service option, and then bypasses the RLP between the originating and receiving mobile stations. As a result, data are directly connected between the mobile stations without passing through the IWF or the PDSN. From step S607, control continues to step S608.

It is determined in step S608 if the higher application protocol is driven in the originating mobile station and the receiving mobile station. If the higher application protocol is driven, the multimedia call is established between the originating mobile station and the receiving mobile station in step S609. In other words, even with the RLP being connected, the mobile stations maintain the visual communication by transmitting multimedia data via the higher application protocol.

As examples of such a higher application protocol, in accordance with the first preferred embodiment of a method of controlling a multimedia call in a mobile communication system, stations can identically define the H.223, G.723, H.263 and H.245 standards, and use the image service option.

If the determination in steps S602, S605 or S608 is negative, control Jumps to step S610 where the multimedia call is not established. For example, if the application layer is not driven in the originating/receiving mobile stations even with the RLP being connected in step S608, the multimedia call between the originating mobile station and the receiving mobile station is treated as a fail in step S610.

Figure 5:
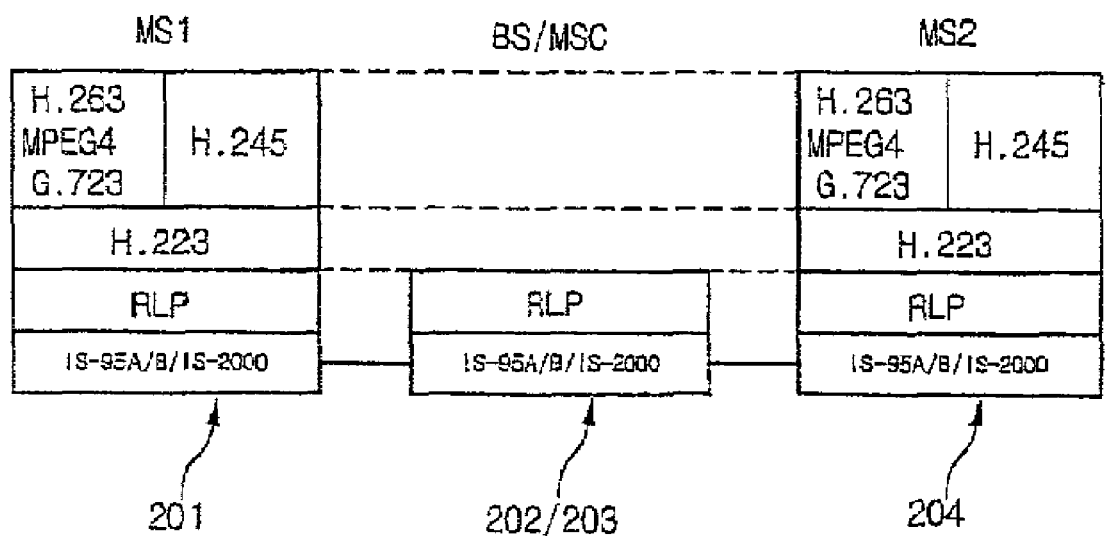
FIG. 5 is a diagram that shows an application protocol for connecting a multimedia call in a mobile communication system according to the system of FIG. 3.

Alternatively, in another preferred embodiment according to the present invention, when establishing a bidirectional multimedia call, a mobile communication system using a high-speed data service such as the IS-95B or the IS-2000 can maintain the multimedia call in a similar fashion to a line switching scheme by using a service option where the fixed bit rate is set up. Then, the base station can pre-allocate additional channels in a predetermined number so that a constant velocity, volume or the like can be maintained without addition or subtraction of channels according to the quantity of data. Preferred embodiments of the mobile communication system according to the present invention can satisfy the visual display terminal standard such as the H.324 as the ITU-T visual display terminal standard or the 3G324M as the 3GPP standard to the application protocol through such a policy. In other words, preferred embodiments of the mobile communication system can meet the visual display terminal standard such as the H.324 as the ITU-T visual display terminal standard or the 3G324M as the 3GPP standard by using the H.263/G.723, H.245 and H.223 as higher application protocols of the RLP, for example, as shown in FIG. 5.

A second preferred embodiment of a system for controlling a multimedia call adopts an multimedia data bypass service option, which directly or indirectly connects between the visual display terminals without passing through the data network Inter-Working Function (IWF) or the PDSN. In order to compensate for the inconsistency of time points between the originating/receiving stations (e.g., mobile stations) after establishing the traffic channel for setting up the multimedia call between the terminals, the second preferred embodiment of a system for controlling a multimedia call preferably provides synchronization or a synchronizing method in which a Packet Data Synchronization protocol (PDSP) is processed to transmit a Packet Data Synchronization Frame (PDSF) before multimedia data transmission. After the synchronization between the originating/receiving stations, functions of the PDSP are preferably bypassed and the multimedia protocol is processed.

Figure 7:
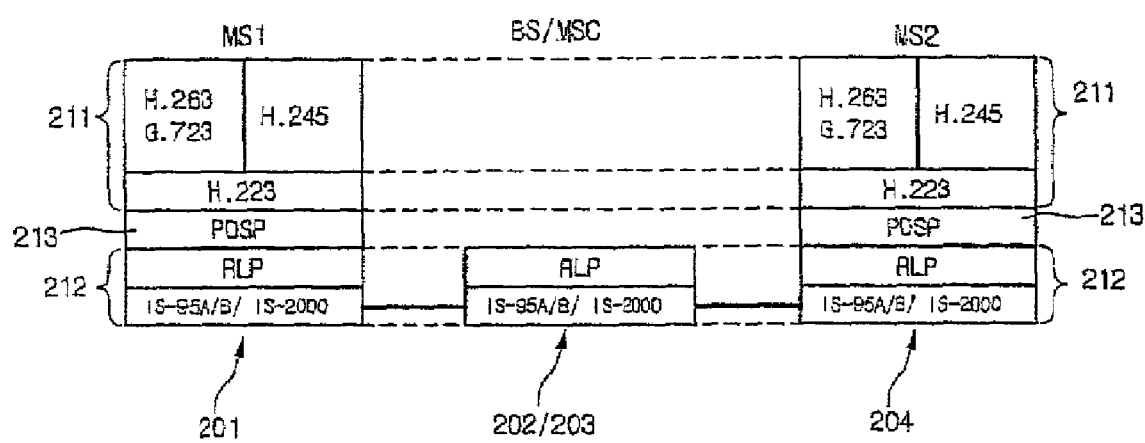
FIG. 7 is a diagram that shows another preferred embodiment of a system of controlling a multimedia call in a mobile communication system according to the present invention.
Figure 8:
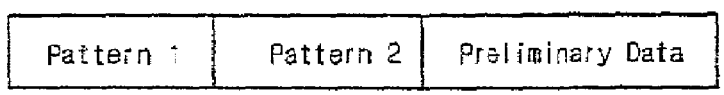
FIG. 8 is a diagram that shows a format of a PDSF in controlling a multimedia call in a mobile communication system according to the second embodiment of the invention.

FIG. 7 is a block diagram for showing a structure of a multimedia call connecting protocol in the multimedia call control system of the mobile communication system according to the second preferred embodiment of the present invention. FIG. 8 is a block diagram for showing a structure of a PDSF in the second preferred embodiment of the system for controlling a multimedia call.

As shown in FIGS. 7 and 8, a mobile station (e.g., MS1 201) has a higher application protocol 211 of the multimedia protocol such as the H.263, G.723, H.245 and the H.223, a lower protocol 212 such as the RLP, the IS-95A/B and the IS-2000, and a PDSP 213 is added between the higher application protocol 211 and the lower protocol 212 to provide synchronization. As shown in FIG. 4, a radio call setup between the originating/receiving mobile stations (e.g., MS1 201 and MS2 204) can be driven similar to a connection model of data service, and can use a service option of the PDSP 213. In setup of the multimedia call, the PDSP 213 is operated before the multimedia data is transmitted, and transmits and synchronizes the PDSF.

Such a PDSF, as shown in FIG. 8, is preferably constituted by at least one or two byte patterns such as Pattern 1 and Pattern 2, which have their own identifiers for synchronization between the visual terminals. Alternatively, the PDSF can add preliminary data for other functions in addition to the 1 or 2 byte pattern.

Figure 9:
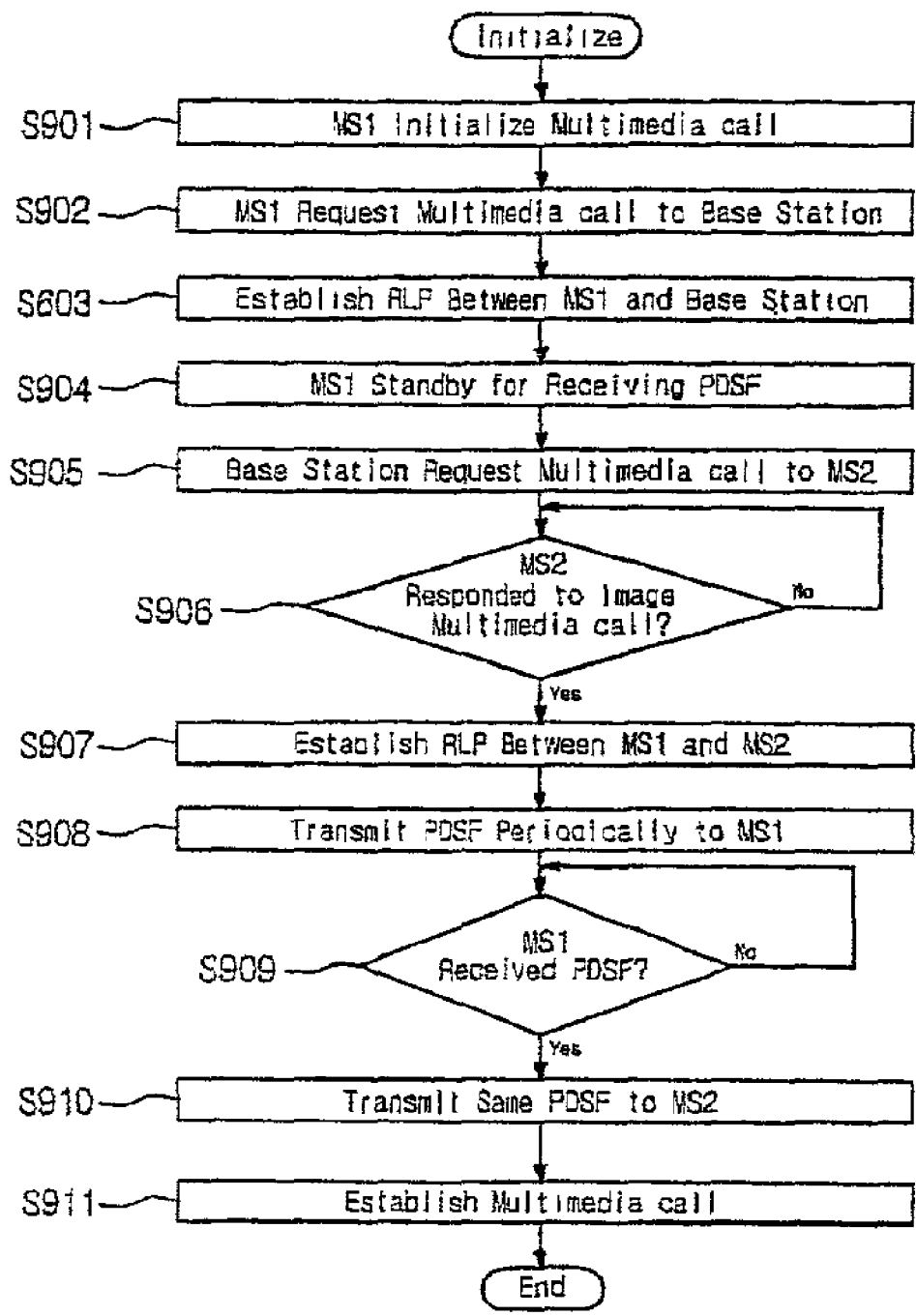
FIG. 9 is a flow chart that shows another preferred embodiment of a method of controlling a multimedia call in a mobile communication system according to the present invention.

FIG. 9 is a flow chart for showing a second preferred embodiment of a method of controlling a multimedia call in a mobile station according to the invention. The method of FIG. 9 can be used for example in the second preferred embodiment of a system for controlling a multimedia call.

As shown in FIG. 9, after a process starts or initialization, control continues to step S901 where an originating mobile station initiates the multimedia call via a user interface. In step S902, the originating mobile station preferably requests the multimedia call from the base station by using the multimedia call service option and a receiving mobile station number. In step S903, the RLP is then set up between the originating mobile station and the base station preferably for controlling the same.

In step S904, when the RLP is set up, the originating mobile station preferably drives the PDSP, and stands by until receiving the PDSF from the receiving mobile station for a predetermined time period. In step S905, the base station for controlling the receiving mobile station recognizes the multimedia call service option of the originating mobile station, and then transmits the multimedia call requests to the receiving mobile station by using the service option and the received telephone number.

In step S906, the receiving mobile station confirms the multimedia call through the service option from the controlling base station, and responds according to the determination of the user whether to receive the multimedia call. If the determination in step S906 is affirmative, control continues to step S907 where after transmitting a response to the multimedia call, the receiving mobile station preferably establishes the traffic channel with the base station according to the service option, and drives the RLP with the base station. Since the base station and/or the mobile switching center connects the RLP between the originating/receiving stations, the data is directly connected between the stations without passing through the IWF or the PDSN.

In step S908, the receiving mobile station drives the PDSP to preferably periodically send the PDSF until the PDSF is received from the originating mobile station. From step S908, control continues to step S909 where it is determined if the originating mobile station received the PDSF. If step S909 determines the PDSF is received from the receiving mobile station, the originating mobile station sends the same PDSF to the receiving mobile station via processing of the PDSP in step S910.

Then, the originating/receiving mobile station bypasses the PDSP and drives the higher image application protocol to transmit the multimedia data to initiate a visual conversation in step S911. If the determination in steps S906 and S909 is negative, the step is respectively repeated, preferably for a prescribed interval. From step S911, the process ends.

The second preferred embodiment of a system for controlling a multimedia call and method according to the present invention relate to synchronizing the originating/receiving stations. For example, the PDSP can be processed to transmit the PDSF before multimedia data transmission to synchronize the originating/receiving stations in order to compensate for the inconsistency in time point between the originating/receiving stations after the traffic channel establishment in order to set up the multimedia call between the stations. Thus, the visual conversation is preferably initiated after synchronization between the originating/receiving stations As described above, preferred embodiments of methods and system for controlling a multimedia call according to the present invention have various advantages.

According to preferred embodiments of systems and methods of controlling a multimedia call in the mobile communication system, delay caused by the relay layer is reduced or prevented and the smooth visual conversation can be obtained while the visual conversation is executed between the stations existing in the same network in the mobile communication system. Further, the preferred embodiments realize the multimedia call without passing through the IWF or the PDSN in the mobile communication system, which can beneficially reduce delay and load.

Preferred embodiments according to the present invention can simplify the internal protocol in setting up the multimedia call in the mobile station, which can beneficially reduce the processing load. Preferred embodiments can effectively operate when using the international standard of the visual terminal such as the H.324.

In addition, preferred embodiments can add the synchronization protocol to visual terminals so that both of the originating/receiving stations can preferably be synchronized before the multimedia call is set up, thereby preventing unnecessary flow of the data while eliminating an additional processing related to a data processing before the radio sections are connected between the both stations in the mobile communication system. Thus, when a general-purpose visual chip is applied based upon the standard such as the H.324, it is unnecessary to consider problems related to establishment of the lower radio section protocol call on the higher multimedia protocol.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system of controlling a multimedia call in a mobile communication system, comprising:

first and second mobile stations to initiate and respond to a multimedia call, respectively and process a visual communication in accordance with a multimedia call service option;

a base station/base station controller configured to set up the multimedia call using a multimedia bypass service option after recognizing the multimedia call service option of at least one of the first and second mobile stations;

a mobile switching center configured to set up the multimedia call using the base station/base station controller to control the second mobile station according to the multimedia call service option from the base station/base station controller;

radio link connecting means used to connect the first and second mobile stations while bypassing a radio link protocol after each of the first and second mobile stations establishes a traffic channel with the base station according to the multimedia call service option; and means for transmitting/receiving multimedia data using a higher application protocol than the radio link protocol to maintain a multimedia call in each of the first and second mobile stations connected by the radio link connecting means, wherein data is communicated between the first and second stations according to the multimedia call service option without passing through an Inter-Working Function (IWF) or a Packet Data Serving Node (PDSN), and wherein each of first and second mobile stations further comprises a packet data synchronization protocol for transmitting a frame for packet data synchronization with a counterpart mobile station.

2. The system of claim 1, wherein the first mobile station initiates the multimedia call in accordance with commands received from a user interface, and sets up the multimedia call using a telephone number of the second mobile station.

3. The system of claim 1, wherein the packet data synchronization protocol is provided between a higher layer of a lower radio link protocol and a lower layer of the higher application protocol.

4. The system of claim 1, wherein the packet data synchronization protocol comprises a unique identifier configured to discriminate the frame of the counterpart mobile station for synchronization with the counterpart mobile station.

5. A method of controlling a multimedia call in a mobile communication system, comprising:
   initiating a radio call from an originating mobile station in accordance with a receiving mobile station telephone number;
   recognizing in a base station/base station controller a multimedia call service option transmitted from the originating mobile station;
   setting up the radio call through the base station where the receiving mobile station is located using the multimedia call service option and the receiving mobile station telephone number;
   confirming the radio call using the service option from the base station and setting up the radio call upon authorization from the receiving mobile station; and
   setting up the multimedia call between the originating/receiving mobile stations after said step of setting up the radio call, the method further comprising:
   transmitting and receiving video data between the originating and receiving mobile stations without using an interworking function (IWF) or a packet data serving node (PDSN), and wherein after the radio call is set up:
   processing a packet data synchronization protocol in each of the originating and receiving mobile stations to periodically transmit a packet data synchronous frame;
   confirming whether to receive the packet data synchronous frame transmitted from a counterpart station; and
   bypassing the packet data synchronization protocol to initiate a higher image application protocol if the packet data synchronous frame is received from the counterpart station.

6. The method of claim 5, wherein authorization of the receiving mobile station is provided by a user of the receiving mobile station accepting the call upon being notified of the radio call using the multimedia call service option.

7. The method of claim 6, wherein if the receiving mobile station authorizes the set up of the radio call, further comprising establishing a traffic channel based on the service option and processing a radio link protocol between the originating/receiving mobile stations and the corresponding base station in a bypass service option.

8. The method of claim 5, wherein the radio call is set-up between the originating and receiving mobile stations in accordance with a radio link protocol (RLP), and wherein the multimedia call is set-up between the originating and receiving mobile station using an application protocol higher than RLP to maintain a visual conversation which transmits a multimedia data.

9. The method of claim 5, further comprising setting up the radio call between the mobile stations in the base station/base station controller by recognizing the multimedia call service option and using a multimedia data bypass service option in setting up the multimedia call between the mobile stations.

10. The method of claim 9, wherein the multimedia data bypass service option between the originating and receiving mobile stations sets up a radio link protocol to connect the multimedia call without passing through an IWF or PDSN.

11. The method of claim 5, wherein the multimedia call service communicates packet data among the originating and receiving mobile stations, the base station/base station controller, and a mobile switching center at a prescribed bit rate by using a fixed bit service option.

12. The method of claim 5, wherein the multimedia call includes packet services having a first data rate and a second data rate the second data rate being higher than the first data rate.

13. The method of claim 5, further comprising:
   processing a radio link protocol between the originating and receiving mobile stations to set up the multimedia call when the multimedia call is initiated by the originating mobile station; and
   connecting the multimedia call between the originating and receiving mobile stations and processing a visual communication between the stations in accordance with a higher application protocol after the radio link protocol is processed.

14. The method of claim 5, wherein the packet data synchronous frame comprises a unique identifier for mutual synchronization between the originating and receiving mobile stations so that the counterpart can discriminate the frame.

15. The method of claim 5, wherein the packet data synchronization comprises:
   initiating the synchronization protocol of the originating mobile station to standby to receive the synchronous frame from the counterpart station after the radio call of the originating station is initiated;
   initiating the synchronization protocol in the receiving mobile station to transmit the synchronous frame to the originating station after the radio call of the receiving station is set up;
   receiving in the originating station the synchronous frame and transmitting a response frame to the receiving station; and
   receiving in the receiving station the response frame transmitted from the originating station.

16. The method of claim 5, further comprising transmitting multimedia data between the originating and receiving mobile stations without using the IWF or PDSN.

17. A system of controlling a multimedia call in a mobile communication system, comprising:
   first and second mobile stations to initiate and respond to a multimedia call, respectively and process multimedia communications in accordance with a multimedia call service option;
   a base station/base station controller configured to set up the multimedia call using a multimedia bypass service option in response to the multimedia call service option of at least one of the first and second mobile stations; and
   a mobile switching center configured to set up the multimedia call using the base station/base station controller to control the second mobile station according to the multimedia call service option from the base station/base station controller, wherein the first mobile station perform multimedia communications with the second mobile station over the set-up multimedia call without an interworking function (IWF) or a packet data serving node (PDSN), and
   wherein each of first and second mobile stations further comprises a packet data synchronization protocol for transmitting a frame for packet data synchronization with a counterpart mobile station.

18. The system of claim 17, wherein data is communicated between the first and second stations according to the multimedia call service option.

19. The system of claim 18, wherein the multimedia call is set-up between the originating and receiving mobile station using an application protocol higher than a radio link protocol.

20. The system of claim 17, wherein the packet data synchronization protocol is provided between a higher layer of a lower radio link protocol and a lower layer of a higher application protocol.

21. The system of claim 17, wherein the packet data synchronization protocol comprises a unique identifier configured to discriminate the frame of the counterpart mobile station for synchronization with the counterpart mobile station.

22. A method of controlling a multimedia call in a mobile communication system, comprising:
    setting up a radio call from an originating mobile station to a receiving mobile station by transmitting a multimedia call service option to a base station/base station controller;
    setting up a multimedia call between the originating and receiving mobile stations after setting up the radio call in accordance with the multimedia call service option; and
    performing multimedia communication between the originating mobile station and the receiving mobile station without an interworking function (IWF) or a packet data serving node (PDSN), the method further comprising:
    processing a packet data synchronization protocol in each of the originating and receiving mobile stations to periodically transmit a packet data synchronous frame after setting up the radio call;
    confirming whether to receive the packet data synchronous frame transmitted from a counterpart station; and
    bypassing the packet data synchronization protocol to initiate a higher image application protocol if the packet data synchronous frame is received from the counterpart station.

23. The method of claim 22, wherein the radio call is set-up between the originating and receiving mobile stations in accordance with a radio link protocol (RLP), and wherein the multimedia call is set-up between the originating and receiving mobile station using an application protocol higher than RLP to maintain multimedia communication so as to transmit a multimedia data.

24. The method of claim 22, further comprising setting up the radio call between the mobile stations in the base station/base station controller by recognizing the multimedia call service option and using a multimedia data bypass service option in setting up the multimedia call between the mobile stations.

25. The method of claim 24, wherein the multimedia data bypass service option between the originating and receiving mobile stations sets up a radio link protocol to connect the multimedia call.

26. The method of claim 22, wherein the packet data synchronization comprises:
    initiating the synchronization protocol of the originating mobile station to standby to receive the synchronous frame from the counterpart station after the radio call of the originating station is initiated;
    initiating the synchronization protocol in the receiving mobile station to transmit the synchronous frame to the originating station after the radio call of the receiving station is set up;
    receiving in the originating station the synchronous frame and transmitting a response frame to the receiving station; and
    receiving in the receiving station the response frame transmitted form the originating station.

* * * * *